Feb. 15, 1938.  C. H. AU  2,108,037
RECORDER
Filed April 7, 1933   8 Sheets-Sheet 1
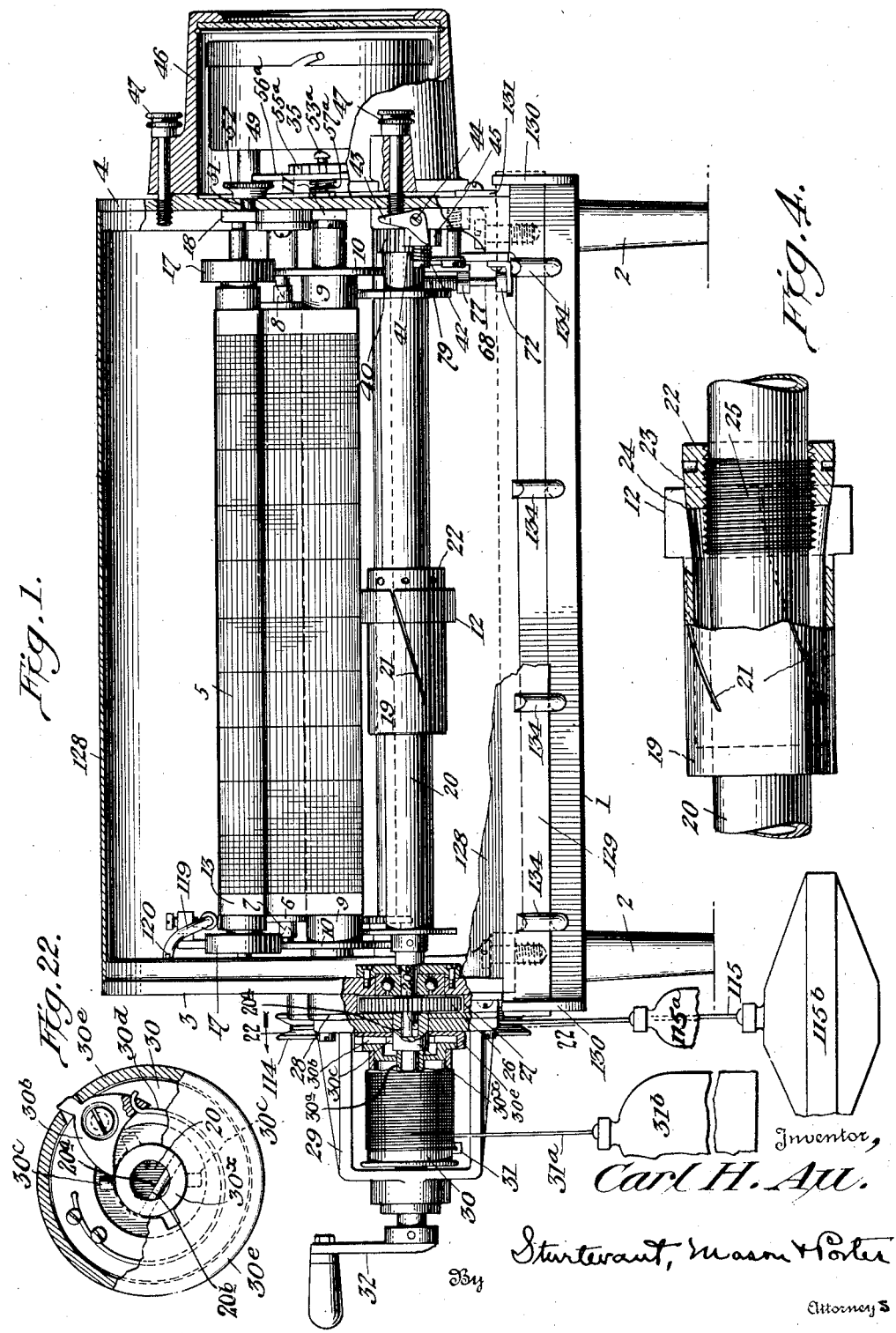

Feb. 15, 1938. C. H. AU 2,108,037
RECORDER
Filed April 7, 1933 8 Sheets-Sheet 2
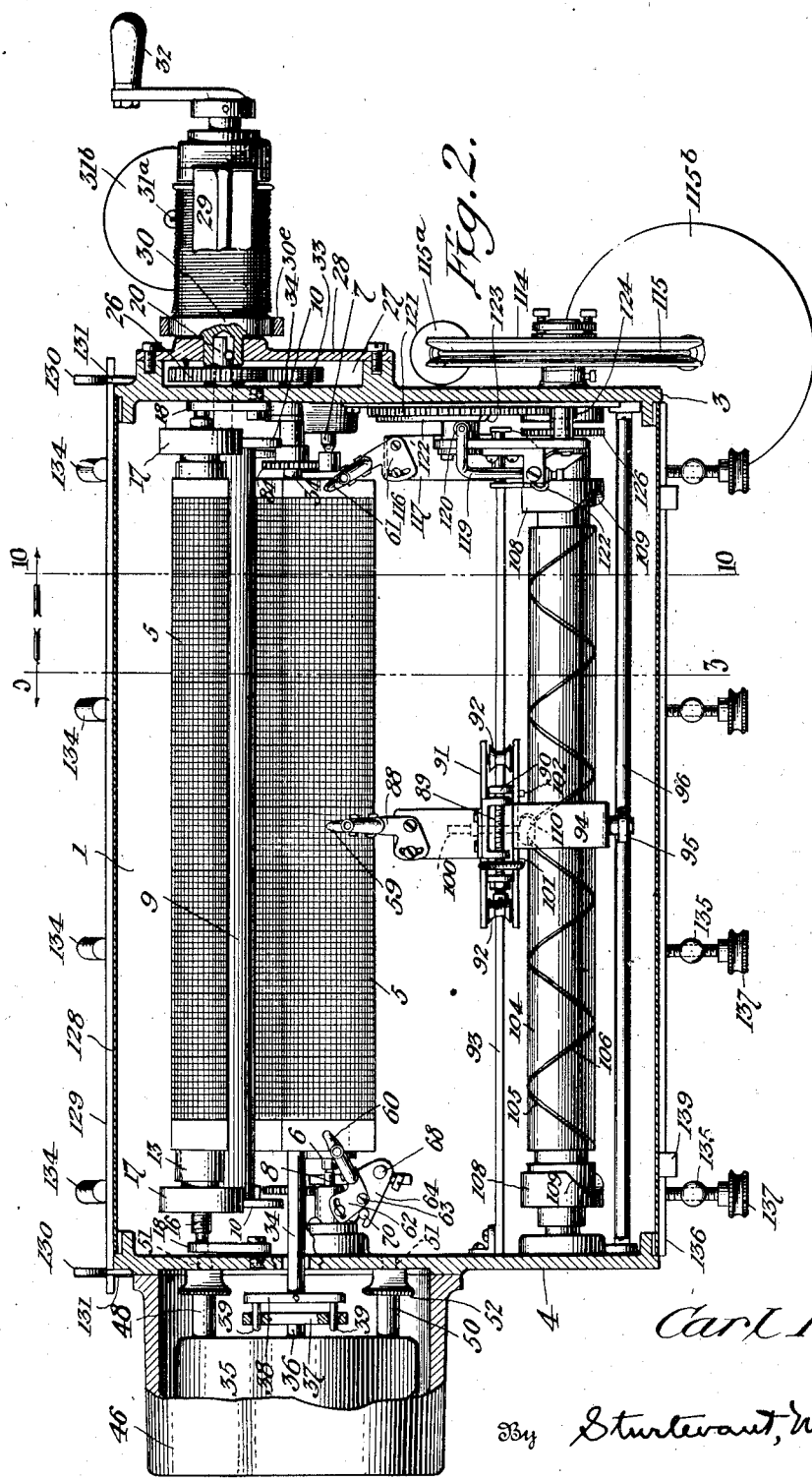

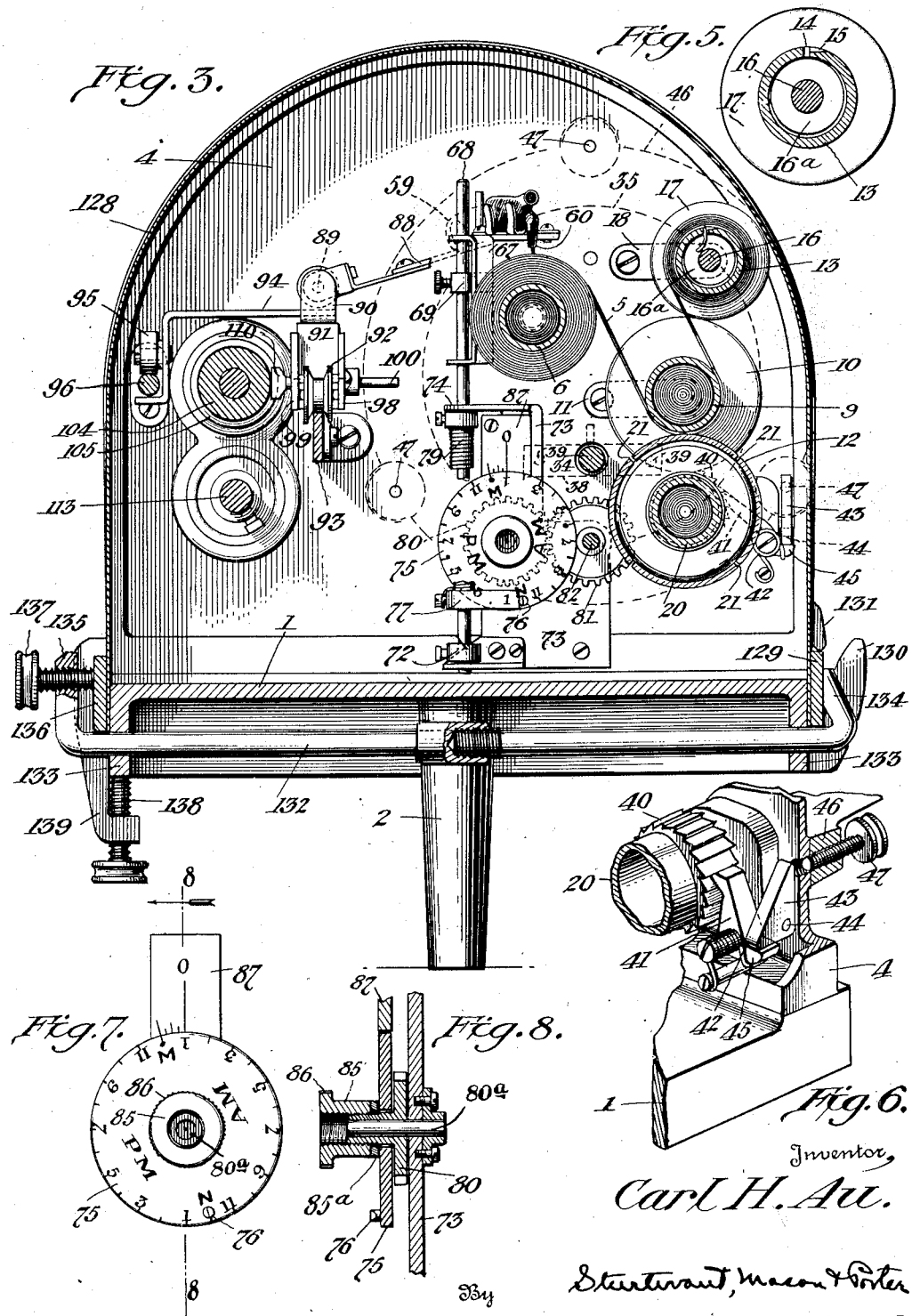

Feb. 15, 1938.　　　C. H. AU　　　2,108,037
RECORDER
Filed April 7, 1933　　　8 Sheets-Sheet 4
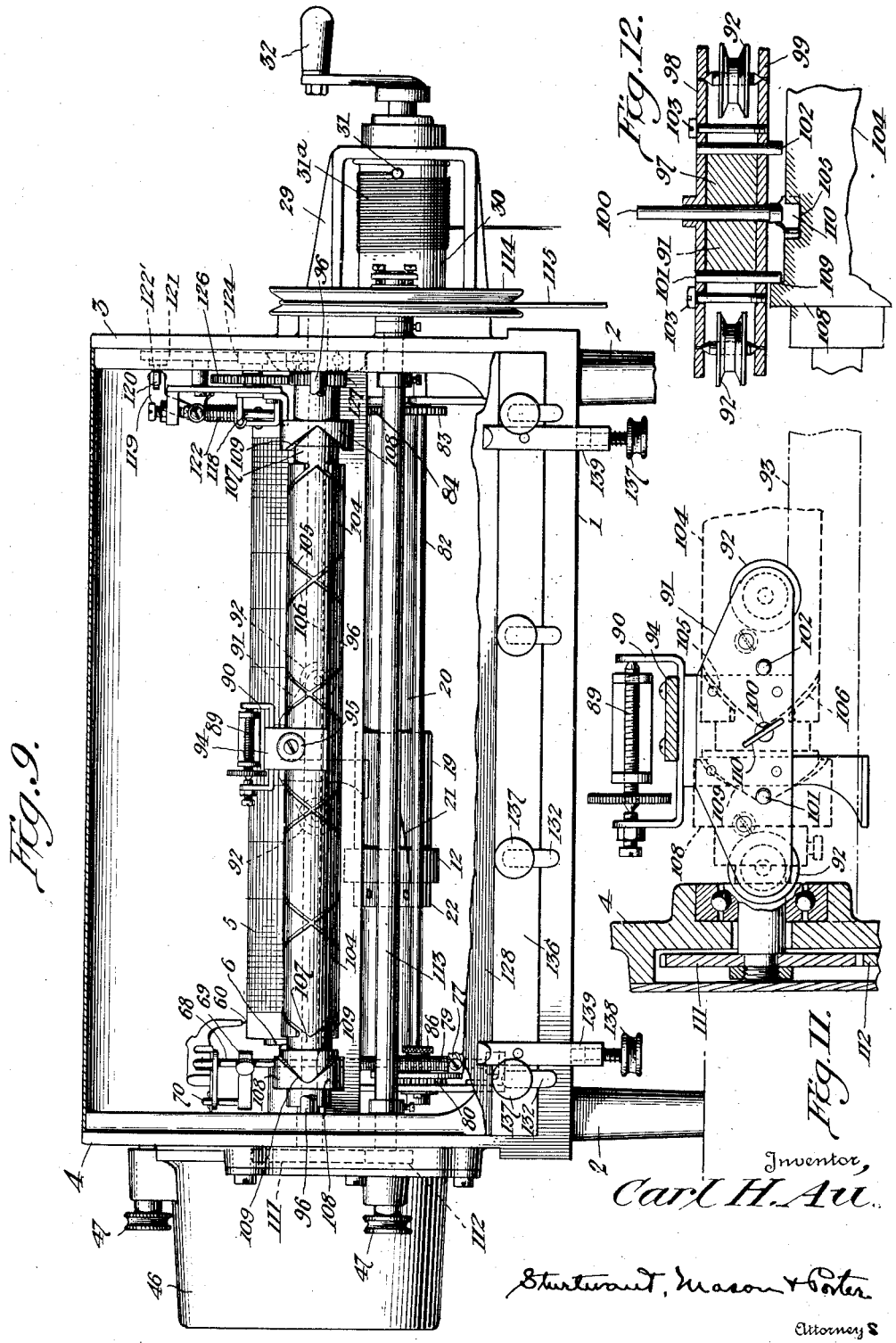

Feb. 15, 1938. C. H. AU 2,108,037
RECORDER
Filed April 7, 1933 8 Sheets-Sheet 5

Inventor,
Carl H. Au.
By Sturtevant, Mason & Porter
Attorneys

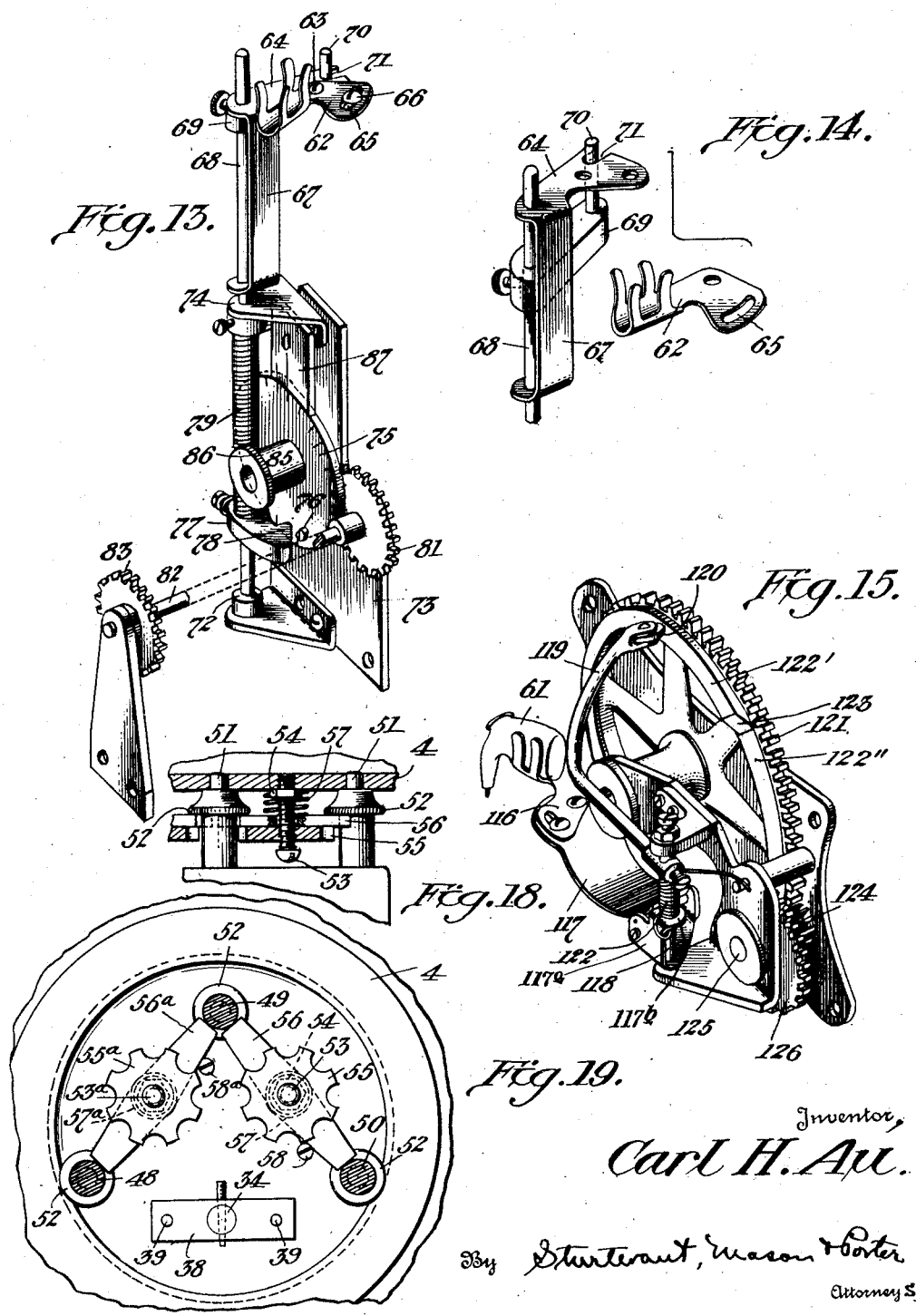

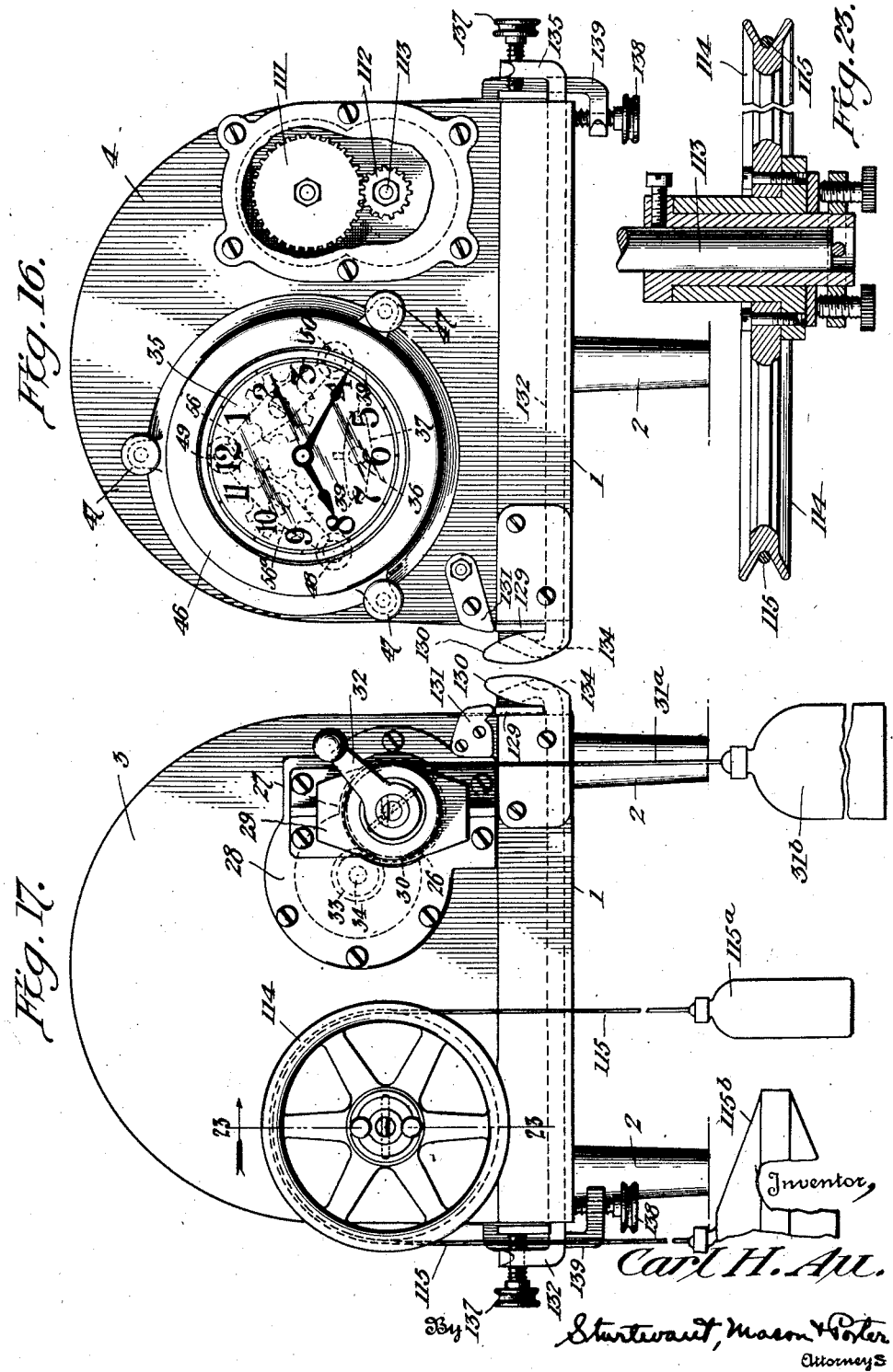

Feb. 15, 1938.  C. H. AU  2,108,037
RECORDER
Filed April 7, 1933  8 Sheets-Sheet 8

Inventor,
Carl H. Au.
By Sturtevant, Mason & Porter
Attorneys

Patented Feb. 15, 1938

2,108,037

UNITED STATES PATENT OFFICE 2,108,037

RECORDER

Carl H. Au, Washington, D. C.

Application April 7, 1933, Serial No. 664,992

4 Claims. (Cl. 234—71)

The invention relates to recorders for recording a variable force or movement, such for example, as the rise or fall of water stages.

An object of the invention is to provide a recorder wherein the record sheet is fed by a time-controlled actuating mechanism, and wherein a stylograph forming a continuous record line on the record sheet is moved at an angle to the path of travel of the record sheet at predetermined regular time intervals.

A still further object of the invention is to provide a recorder of the above type having a stylograph and carriage therefor, wherein the carriage is moved back and forth by a control drum in turn actuated by variations in the force or movement being recorded, which control drum is provided with means for reversing the carriage while still moving in the same direction, with an auxiliary stylograph making a continuous line on the record sheet, which auxiliary stylograph is moved at an angle to the travel of the record sheet to offset the record line when the carriage is reversed by a continuous movement of the drum in the same direction.

These and other objects will in part be obvious and will in part be hereinafter more fully disclosed.

In the drawings which show by way of illustration one embodiment of the invention—

Figure 1 is a view partly in vertical section and partly in side elevation showing a recorder embodying the improvements, certain parts of the recording mechanism being omitted so as to show more clearly the sheet feeding mechanism;

Fig. 2 is a horizontal sectional view through the recorder, said view being taken above the mechanism therein so as to show the record sheet and the stylograph associated therewith in plan;

Fig. 3 is a vertical transverse sectional view through the recorder on the line 3—3 of Fig. 2;

Fig. 4 is a detail on an enlarged scale and partly in section showing the feed roller engaging and driving the record sheet;

Fig. 5 is a sectional view through the receiving roll for the record sheet taken centrally thereof;

Fig. 6 is a view partly in perspective and partly in section showing the locking mechanism for preventing movement of the paper feed by the actuating mechanism when the clock or timing device is removed;

Fig. 7 is a face view of the control disk which moves the stylograph recording time intervals on the sheet;

Fig. 8 is a sectional view on the line 8—8 of Fig. 7;

Fig. 9 is a view partly in side elevation and partly in section of the recorder, and showing in elevation the mechanism within the recorder, omitting the receiving roll, the view being taken from the side of the recorder adjacent the control drum;

Fig. 11 is a view partly in vertical section and partly in side elevation, showing the means for reversing the travel of the carriage while said control drum continues to move in the same direction;

Fig. 12 is a horizontal view through the carriage carrying the stylograph producing the record of the variable on the record sheet;

Fig. 13 is a view in perspective showing the means for supporting and operating the stylograph which records the time intervals on the record sheet;

Fig. 14 is a view in perspective showing the supporting and operating means for the time interval recording stylograph, said parts being separated to more clearly show their structure;

Fig. 15 is a perspective view of the supporting means and operating cam controlling the stylograph which indicates whether the record line of the variable on the record sheet is formed by a reversal of the actuating drum or by a reversal of the carriage while the drum is moving in the same direction;

Fig. 16 is an end view of the recorder with the cover plates removed so as to show the timing device and the transmission gears for operating the control drum;

Fig. 17 is an end view of the recorder showing the actuating mechanism and the winding means therefor, also showing the float-controlled driving wheel for the control drum;

Fig. 18 is a sectional view through the casing showing the manner of attaching the clock or timing device thereto;

Fig. 19 is a sectional view through the supporting post attached to the clock or timing means and the clamping devices carried by the casing which secure the timing means in place;

Fig. 22 is a sectional view through the actuating drum for the actuating shaft showing the ratchet means for connecting the sections of the drum, and Fig. 23 is a sectional view through the cable wheel and the means for supporting the same which operates the control drum.

Figure 10:
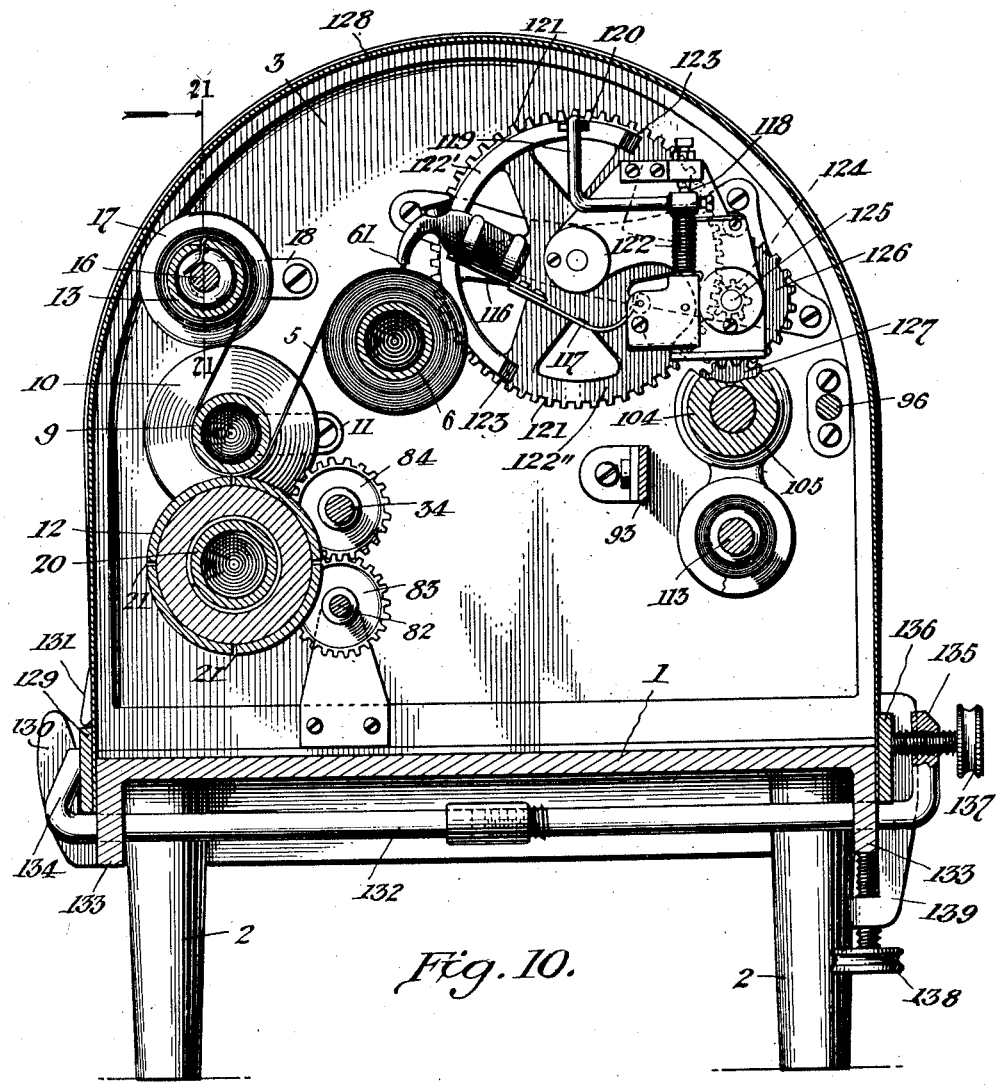
Fig. 10 is a vertical sectional view through the recorder on the line 10—10 of Fig. 2.
Figure 21:
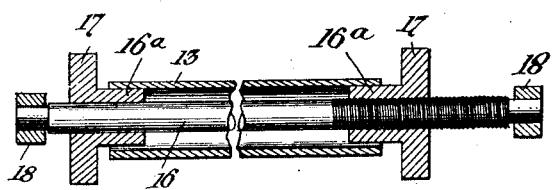
Fig. 21 is a sectional view through the receiving roll for the record sheet showing the means for supporting and rotating the same.

The recorder includes a casing in which is mounted a stock roll having a record sheet wound thereon. This record sheet is transferred to a receiving roll by a feeding mechanism engaging the sheet between the stock roll and the receiving roll. The feeding mechanism includes a roll driven by a time-controlled actuating mechanism, and this roll engaging the sheet is so constructed that the diameter thereof may be varied manually for varying the speed of the sheet without requiring any change in the speed of the actuating mechanism driving the sheet. Associated with the actuating means driving the sheet is a stylograph which produces a continuous line on the record sheet, extending lengthwise of the sheet, and associated with this stylograph is a mechanism including a control cam which causes the stylograph to move at an angle to the direction of travel of the sheet at predetermined regular time intervals. A stylograph mounted on the traveling carriage is moved across the sheet for producing a record line thereon, and the travel of the carriage is determined by the control drum actuated in the present embodiment of the invention, by a float, which rises and falls with the water stage. The control drum has associated therewith mechanism for reversing the travel of the carriage while the control drum is moving in the same direction. Associated with this recording stylograph is an auxiliary stylograph which forms a line on the record sheet, and the auxiliary stylograph is controlled by a cam which in turn is driven by the control drum. The cam is so shaped and timed as to offset the record line produced by the auxiliary stylograph, when the carriage is reversed by a continuous movement of the drum in the same direction.

It is thought that the invention will be better understood by a detail description of the illustrated embodiment thereof. The recorder includes a supporting base 1, shown as mounted on supporting legs 2—2. Attached to the base are end members 3 and 4. The record sheet is indicated at 5. This record sheet is wound on a shaft 6 which is supported in a casing by pivot posts 7 and 8, one of which is yieldingly mounted. The record sheet passes under and partly around a shaft 9 having spaced flanges 10—10 forming frictional driving rollers for winding the sheet on to the receiving shaft. The shaft 9 is mounted in arms 11—11 which are pivoted to the end members of the recorder, and the movement of the arms 11 in a clockwise direction as viewed in Fig. 3, through the weight of the shaft 9 is limited through the contact of the paper with the feed roll 12. This shaft serves as a presser roll causing the sheet to be gripped by the feed roll. The sheet is wound on to a receiving sleeve 13. This sleeve, as shown in Fig. 5 of the drawings, is provided with a radial slot 14, and is also provided with a transverse kerf 15 leading from one side wall of the slot 14. This provides an upstanding shoulder at the other side of the slot which aids the operator in the inserting of the end of the record sheet through the slot for clamping the record sheet to the winding sleeve.

This sleeve 13 on which the sheet is wound is carried by a shaft 16 provided with trunnions 16a, 16a which are of slightly less diameter than the inner diameter of the sleeve, so that the sleeve rests on the shaft and is driven by friction when the shaft is turned. The shaft 16 is also provided with rollers 17, 17. The shaft is mounted in arms 18, 18 which are pivoted to the end members of the recorder, and it is the weight of the shaft 16, the sleeve 13 and the paper wound on the sleeve 13 that bears the rollers 17, 17 downward into frictional gripping contact with the rollers 10, 10, and thus it is that the receiving sleeve is frictionally driven for winding the record sheet thereon. The rollers 17 and 10 are so proportioned in diameter as to drive the sleeve 13 so as to wind the sheet firmly on the sleeve, but the speed of movement of the sleeve will decrease as the size of the roll increases, which is permitted by the slippage in the frictional driving contact between the parts. The feeding roll 12 is shown in detail in Fig. 4. Said feeding roll is carried by a sleeve member 19, which sleeve member is fixed to a shaft 20. The sleeve and the roll are provided with a series of slots 21 extending all the way through the sleeve and dividing the roll 12 into separate sections supported by the integral end portion of the sleeve 19. Also mounted on the shaft 20 is a control collar 22 which has a tapered face 23 engaging the inner tapered face 24 on the sleeve. The shaft 20 is threaded as indicated at 25. The collar 22 is also provided with a thread engaging this threaded portion of the shaft. When the collar is turned on the shaft 20 so as to move it to the left, as viewed in Fig. 4, it will expand the feed roll 12 and give thereto a greater diameter and a greater circumference. On the other hand, when the collar 22 is moved in the opposite direction, the roll will be decreased in diameter and in circumference through the spring of the metal holding said sleeve firmly contacting with said collar. As noted above, the shaft 9 serves as a presser roll and through its weight and the weight of the parts supported thereby, will hold the record sheet in contact with this feed roll 12, as the feed roll 12 is the sole means limiting the downward bodily movement of the shaft 9. The rollers 10 which transmit the movement of the shaft 9 to the rollers 17 do not engage the shaft 20. The shaft 20 is mounted in bearings in the end members 3 and 4. This shaft extends through the end member 3 and carries a gear 26 thereon. This gear is located in a chamber 27 formed in the end member and closed by a cover plate 28.

Attached to the cover plate 28 is a bracket 29 in which is mounted a drum 30. The drum 30 has a projecting sleeve 30x which receives the end of the shaft 20. The shaft 20 is slabbed at one side thereof, as indicated at 20a in Figs. 1 and 22. The sleeve 30x carries a cross pin 20b which enters and crosses the opening receiving the end of the shaft and this pin contacts with the slabbed face of the shaft so as to prevent rotation of the shaft relative to the sleeve. By this construction the drum may be readily connected to the shaft and the shaft end will serve as a supporting bearing for the drum. The drum carries a pin 31 to which a cable 31a may be attached, and the cable carries a weight 31b. This drum is made in two sections. The inner section is indicated in the drawings at 30a, (see Figures 1, 2 and 22) and it is this inner section which is directly connected to the shaft 20. The outer section of the drum is connected to the inner section thereof by a ratchet mechanism which includes a pawl 30b adapted to engage projections 30c, 30c on the inner section of the drum. A spring 30d engages the tail end of the pawl of the ratchet and normally holds it positioned so that it engages the projections 30c. Through this ratchet mechanism, when the drum is turned in one direction, it will turn the shaft, and when the shaft is stationary, the drum may be turned in the opposite direction for the purpose of winding the cable which operates the drum. Surrounding the outer section of the drum is a ring 30e having an opening therethrough. The pawl 30b is provided with a projecting portion which extends into said opening when the pawl is in operative position for engagement with the projections 30c. By turning this ring relative to the outer section of the drum, the pawl will be forced to a position so that it will not contact with the projections 30c. This provides a means whereby the outer section of the drum may be completely released from the inner section and turned when desired. A crank 32 is attached to the outer section for turning the same to raise the weight, and the weight as it is moved downward by gravity, turns the drum and thus actuates the shaft 20. This gravity actuating mechanism is of the usual type, and further description thereof is not thought necessary.

The gear 26 on the shaft 20 meshes with a gear 33 carried by a shaft 34 (see Figures 2 and 17). This shaft 34 extends from one end member to the other. The right-hand end of the shaft 34, as viewed in Fig. 2, is mounted in a bearing, while the left-hand end passes freely through an opening in the end member. Attached to the end member 4 is a clock 35. The escapement shaft 36 of the clock carries a crosshead 37 and a bar 38 fixed to the shaft 34 rigidly carries pins 39, 39 which engage openings in the crosshead 37. When the clock is in place, the left-hand end of the shaft 34 is supported through this rigid connection with the crosshead 37. This produces a construction wherein the escapement shaft of the clock and the control shaft 34 for timing the actuating mechanism will be properly connected so as to turn freely in the supporting bearings therefor.

The shaft 20 is provided with a ratchet wheel 40. A pawl 41 is moved into engagement with the ratchet wheel by a spring 42. A lever 43 pivoted at 44 overlies the tail 45 of the pawl 41. Enclosing the clock or timing device 35 is a casing 46. This casing is secured to the end member 4 by suitable screws, one of which is indicated at 47 in Fig. 6 of the drawings. When this screw is threaded through the end member for attaching the casing 46 thereto, the lever 43 will be swung on its pivot into contact with the tail of the pawl 41, and this will move the pawl out of engagement with the ratchet wheel 40. When, however, the screw 47 is removed, then the pawl is released and will move into engagement with the ratchet. The purpose of this pawl and ratchet is to lock the shaft 20 from any rotations in a clockwise direction, as viewed in Figures 3 and 6. This locking of the shaft 20 only occurs when the casing is removed to remove the clock. When one wishes to remove the clock, the shaft 20 is automatically locked by the removing of the casing, and therefore, when the escapement mechanism of the clock is disconnected from the shaft 34, it will not release the actuating mechanism so that the feed of the record sheet will continue. The feed roll 12 can only be moved through the actuating mechanism under the control of the escapement of the clock. When the clock is removed, then this roll is locked from movement in a direction for feeding the paper by the mechanism just described.

The clock is provided (Figures 1, 2, 18 and 19) with three supporting posts 48, 49 and 50. These posts are rigidly attached to the clock and each is provided with a reduced projecting pin portion 51 adapted to engage a similar shaped recess or opening in the end member 4. On each post is a head 52 forming a right angle shoulder with the post. Attached to the end member 4 is a supporting screw 53. This screw is rigidly secured to the end member by a lock nut 54. There is a clamping member 55 threaded on the screw which can be turned by hand. There is a cross bar 56 having a free connection with the screw and pressed yieldingly against the clamping member by a spring 57. There is a similar supporting screw 53a having a clamping member 55a, a cross bar 56a, and a spring. When the posts of the clock are placed in the recesses in the end member 4, then the cross bars 56 and 56a may be placed so that the ends thereof will contact with the heads 52 on the posts. When the clamping members 55 and 55a are turned in a clockwise direction as viewed in Fig. 19, these cross bars will be forced against the shoulders on the heads 52 and cause the posts to be firmly clamped against the end member 4.

Figure 20:
Fig. 20 is a plan view of a portion of the record sheet.

In Fig. 20 of the drawings, there is shown a portion of a record sheet of the usual character. Said record sheet is in the form of a long strip of section paper, the lines of which are of equal unit distances apart. The distances between the lines running lengthwise of the record sheet may be utilized as indicating the variations of the variable force or movement, as for example, the extent of the rise and fall of the water stage. The lines running transversely across the record sheet may be used for indicating time intervals. The recorder is provided with a stylograph indicated at 59, which makes the record line indicated at $a$ in Fig. 20 of the drawings. It is also provided with a stylograph 60 which makes the record line $b$ on the record sheet, as shown in Fig. 20. The recorder is further provided with a stylograph 61 which makes the record line $c$ as shown in Fig. 20. The purpose of these stylographs will now be described more in detail, and the mechanism for operating the same. The stylograph 60 is used for the purpose of indicating time intervals on the record sheet. The means for mounting and operating the same is shown in detail in Figures 13 and 14 of the drawings. The stylograph 60 is mounted in a carrying arm 62. This arm has yielding fingers projecting upwardly and spaced from each other, in which the stylograph is removably mounted. The arm is pivoted at 63 to a supporting bracket 64. The arm has a slot 65 therein and a screw 66 passing through the slot and threaded into the bracket serves as a means to permit the arm to be adjusted. The bracket has a depending member 67 with the lower end portion bent at right angles and provided with an opening. A rod 68 extends through the opening in the depending member 67 and in the supporting bracket 64, and said bracket has a limited movement lengthwise of the rod. Attached to the rod is a supporting arm 69 carrying a pin 70 which engages a notched portion 71 in the bracket 64.

When it is desired to swing the stylograph away from the record sheet, the bracket may be raised to lift the notch 71 from engagement with the pin 70 and then the bracket can be swung on the rod 68. When, however, the bracket is in the position shown in Fig. 13, it is fixed to the rod 68, and any turning movements imparted to the rod, will be in turn imparted to the stylograph. This rod is mounted in a bearing 72 attached to the supporting plate 73 which in turn is carried by the end member 4. There is a bearing member 74 at the upper end of this plate. Mounted for rotation in a bearing (Fig. 8) carried by the plate 73 is a disk 75 carrying one or more cam projections 76. The cam projection 76 is in the form of a pin inserted in an opening in the disk 75. The pin projects beyond the face of the disk and has a cam face. Attached to the rod 68 is an arm 77 having a cam-shaped end 78 which is adapted to engage these cam projections 76 as the disk 75 rotates. A spring 79 surrounding the rod 68 and attached to the upper bearing member 74 serves as a means for yieldingly holding the arm 77 in contact with the disk 75. Secured to the disk 75 is a pinion 80, shown in detail in Fig. 8. The pinion 80 and the disk 75 are mounted for free rotation on the shaft 80a, see Figs. 7 and 8. This pinion meshes with a pinion 81 on the shaft 82. The shaft 82 extends across one end of the recorder to the other, and carries a pinion 83. The pinion 82 meshes with a pinion 84 on the shaft 34. This shaft 34, as has been described above, is operated by an actuating mechanism and is connected to the escapement mechanism of the clock, so that it is the timing shaft of the paper feed. The gears are so proportioned that the control disk 75 will be given one rotation every twenty-four hours. It may be driven at a different timing, if desired, but whatever the selected timing may be, it is controlled by the clock.

Referring to Fig. 8, it will be noted that the control disk 75 lies between the pinion 80 and the threaded sleeve 85 having a knurled head 86. There is also a clamping washer 85a between the sleeve and the disk 75. By turning this sleeve in the proper direction, the disk 75 may be released from its connection to the pinion 80. This permits an adjustment of the disk. The disk is preferably provided with dial figures indicating the hours of the day, and associated with the disk is a gauge plate 87 which is fixed to the supporting plate 73. This gauge plate has a zero line thereon to aid in the proper setting of the disk 75. The stylograph 60 makes a continuous line on the record sheet as indicated at b in Fig. 20 of the drawings. When this projecting portion 76 passes beneath the cam end of the arm 77, it will, however, give a movement to the supporting arm for the stylograph 60, so that it is given a movement at an angle to the direction of travel of the sheet, and this will produce an angular bearing on the record line b as indicated at b'. This indicates a time interval, and by adjusting the disk it may indicate any desired time interval during the twenty-four hour period. It is understood that this control disk may have attached thereto projecting portions at any desired time intervals, from one hour intervals to two hour intervals, and so on to twenty-four hour intervals, just as desired. Each time a projecting portion passes the arm, 77, it will make a time interval indication such as indicated at b'. These time intervals may be used to determine the proper speed of the record sheet. If the paper is sectioned so that there are certain heavy lines extending transversely thereacross, indicating the time intervals which are to be recorded, and it is shown that these time intervals are out of register with the lines, they can be shifted so as to bring them into register with any one of the section lines on the paper by shifting the disk 75 and the feed of the paper can be varied without changing the speed of the clock by enlarging or decreasing the size of the feed roll through the means which has been described above. This provides a very simple means whereby the time interval indicating stylograph and the paper feeding means may both be controlled by the same clock and the feed of the paper varied without changing the timing of the clock.

The stylograph 59 is carried by a supporting arm 88. This arm is fixed to a shaft 89 mounted in a supporting plate 90 attached to a carriage 91. The carriage 91 is provided with wheels 92, 92 grooved so as to engage a supporting rail 93 which extends from one end member to the other and is secured thereto so as to form a rigid supporting rail on which the carriage travels. The carriage has an arm 94 carrying a wheel 95 which bears on a rail 96 likewise extending from one end member to the other and fixed thereto. The carriage includes a center block 97 and side plates 98 and 99. There is a shaft 100 passing through the plates and the block, and also pins 101 and 102 which pass through the plates at the ends of the block. There are bolts 103, 103 which pass through these plates at a distance from the center block. The wheels 92, 92 have tapered end members engaging suitable bearings in these plates and by tightening or loosening the bolts 103, the wheels will be properly centered and held in their bearings and run freely therein.

The carriage is moved back and forth transversely of the direction of travel of the record sheet by the control drum 104. This control drum, as shown more clearly in Fig. 9, is provided with two spiral grooves or slots 105 and 106. These spiral grooves are oppositely wound and cross each other, and they meet for crossing at the ends of the drum. The two ends of the drum are similar in construction, and the construction at one end only will be described, similar reference letters being placed to indicate similar parts at the other end of the drum. The drum is provided with a recess 107, and the spiral grooves or slots open into this recess 107. On the shaft forming a part of the drum is a cam member 108 having a cam face 109. The shaft 100 on the carriage is provided with an actuating boat 110. The shaft is free to turn in the carriage so that the boat may shift its angular position. This boat extends into a spiral groove or slot, and as the drum turns, it will force the carriage by means of the actuating boat to move along its supporting rail 93. The pin 101 projects beyond the plate 99 and cooperates with the cam face 109. If the carriage is moving to the left as viewed in Fig. 9, the actuating boat will pass out of the slot as the pin 101 contacts with the cam face 109 and moves along the same. The boat is completely out of the slot, as shown in Fig. 11, when the pin reaches its extreme movement along the cam face 109. It is the actuating boat that propels the pin along the cam face 109 to the position shown in Fig. 11, and then it is the cam face 109 that reverses the movement of the carriage, forcing the pin 101 to the right as viewed in this figure, and this will cause the actuating boat to turn and pass into the slot 105. It is the pin 102 that brings about the reversal of the movement of the carriage when it reaches the other end of the drum. From the above it will be noted that the carriage will be moved by the rotation of the control drum, and as long as the drum continues to rotate in the same direction, the carriage will move first one way across the drum, be reversed, and then move the other way across the drum. Also at any time the drum may stop and reverse its movement, and this likewise will reverse the movement of the carriage. The drum shaft extends through the end member 4, and carries a pinion 111 on the outer end thereof. This pinion meshes with a pinion 112 on a shaft 113. The shaft 113 extends through both end members and carries a drum or cable wheel 114. A cable 115 extends about this cable wheel or drum and carries at one end thereof a weight 115a, and at the other end thereof a float 115b which is so weighted as to float in the water and remain at the surface thereof, so that when the water stage rises, the float will be raised, allowing the weight to move downward and the cable wheel to be rotated. When, however, the float moves downward, due to the drop or fall in the water level, then the cable wheel will be rotated in the opposite direction. The purpose of the pinions 111 and 112 is to vary the speed of actuation of the drum so that the travel of the carriage will make the desired graph record on the record sheet that is suitable to the extremes in the variation of the water stage being recorded. These pinions can readily be interchanged for varying the speed of the drum relative to the speed of the shaft to which the cable wheel is attached.

From the above it will be apparent that the graph record will be made on the recording sheet which indicates the rise and fall of the water stage. Let us assume that the stylograph is moving in the direction of the arrow $x$ in Fig. 20, when the water stage is rising, and that when the stylograph reaches the side edge of the record sheet, the water stage continues to rise and the drum continues to rotate in the same direction. The record line will then be reversed, and the portion thereof indicated at $a$ does not indicate a fall in the water stage, but a continued rising of the water stage. In order to indicate on the record sheet that this record line $a$ is produced by a continued rising of the water stage instead of a fall in the water stage, the stylograph 61 has been provided which makes the record line $c$ on the record sheet. This stylograph 61 is adjustably carried by a supporting bracket 116. The supporting bracket 116 is mounted on an arm 117. The arm 117 is bent upwardly at 117a and thence laterally at 117b so as to provide spaced bearings engaging the shaft 118, see Fig. 15. Also attached to this shaft 118 is an arm 119 carrying a roller 120 adapted to contact with a control wheel 121. A spring 122 swings the arm so that it contacts with the side face 122" of this wheel 121. The wheel 121 has a raised cam section 122' which extends throughout 180° of the circumference of the wheel (Fig. 10). The ends 123 of this section 122' are inclined so that the roller will freely run from one section on to the other. The roller bears on the portion 122' when the boat 110 is in one groove of the drum and on the portion 122" when the actuating boat is in the other groove. The actuating boat moves along one of the grooves in the drum and into the other groove as long as the drum is continuing to rotate in the same direction, and when the direction is reversed, then the actuating boat will reverse its direction of movement and again move from one groove into the other just as long as the drum is continuing to move in this same reversed direction. This wheel 121 is a gear wheel and has teeth thereon meshing with a pinion 124 carried by a shaft 125 (see Figs. 2, 9, 10 and 15). The shaft 125 carries a gear wheel 126, and this gear wheel 126 meshes with a gear wheel 127 attached to the shaft carrying the control drum. Thus it is that the wheel 121 is moved in timing with the drum and makes one complete rotation for a movement of the carriage from one end of the drum to the other end thereof and back to the first end of the drum.

Referring again to Fig. 10, and also to Fig. 20 showing the record sheet. In Fig. 20 the portions of the record at A, A' and A" indicate a rise of the water when the stylograph 59 is moving to the right of the paper. $a$, $a'$, $a''$ and $a'''$ indicate a rise of the water when the stylograph 59 is moving to the left, that is, the boat is in the other groove. Similarly D and D' indicate a fall of water when the stylograph is moving to the left and $d$, $d'$ and $d''$ indicate a fall of water when the stylograph 59 is moving to the right. Points $r$, $r'$, $r''$, $r'''$ and $r''''$ are reversing points of the carriage when the boat 110 passes from one groove to the other which is shown on the record by the offsetting of the record line $c$. The points $h$, $h'$, and $h''$ show a reversal of the stylograph due to the water changing from a rising stage to a falling one, that is, a high point of the water. The points $l$, $l'$ and $l''$ show a reversal of the stylograph due to the water changing from a falling to a rising stage, that is, a low point of the water. Let us assume that the wheel 121 is turning in a counter-clockwise direction and the water stage is rising. The stylograph is traveling in the direction of the arrow $x$ and is producing a record line A indicating a rise in the water stage. The carriage is approaching one end of the drum, and as the drum continues to rotate in the same direction because of the continued rise in the water stage, the wheel 121 also continues to move counter-clockwise, and as the carriage is reversed by the actuating boat passing into the other spiral groove, the roller passes off from the portion 122' down the incline 123 on to the portion 122", and this offsets the record line $c$, as indicated at $c'$. This offset $c'$ in the record line $c$ indicates that a reversal of the water stage record line at the edge end of the sheet was produced by the continued rising of the water stage. When the point $h$ is reached, the water stage begins to fall, and the carriage reverses its direction of motion and produces the record line $d$ which is a falling of the water stage. Again, when the carriage reaches the end of the drum and the water stage continues to fall, the stylograph 59 will be reversed, but the drum will continue to move in the same direction, and this will cause the roller to pass up on to the section 122' and again shift the stylograph 61 so as to bring it back to the normal record line $c$. The portion D of the record line indicates a continued fall in the water stage. At the point $l$ the water stage begins to rise, as shown at A', and the carriage is reversed at $r''$ and produces a record line $a'$, indicating a continued rise in the water stage. At the point $h'$ the water stage reverses and begins to fall as along $d'$. The carriage moves to the end of the drum at $l'$, but here the water stage happens to reverse at the end of travel of the carriage, and therefore the boat will pass back into the same groove because the drum reverses. The roller being right at the incline 123 will pass along a portion thereof and then back on to the section 122″, and this produces a slight jog c″, but it does not indicate a change of boat from one groove to the other. The record line following the carriage reversal point l′ is the rising record line a″. Following this is a falling record line d″ with a reversal r‴ in the travel of the carriage produced by a continued falling of the water stage, as is indicated by the offsetting of the record line c. The water continues to fall along D′ to l″, rises along A″, continues to rise at carriage reversal at r‴″ along a‴.

It is believed from the above it will be apparent that the record line c clearly indicates whether the reversal in the record line produced by the variable movement is brought about by a reversal of the carriage through a change in the direction of movement of the variable, or merely by the fact that the carriage has reached the end of the drum and must change its direction of motion in order to produce a record line on the sheet, while the drum continues in the same direction.

The carriage reciprocates back and forth between fixed limits. The stylograph 60 recording the time intervals produces a normal record line having a fixed position relative to the limits of travel of the carriage, and it is offset from this normal line at predetermined timed intervals. The stylograph 61 producing the normal record line c also has a fixed position relative to the limits of movement of the carriage and relative to the normal position of the stylograph 60 producing the record line b. The stylograph producing the record line c is shifted to produce an offset record line, but this offset line is also in a fixed position relative to the limits of travel of the carriage. These record lines b and c may, therefore, be said to be fixed base lines, and may be used as such in interpreting or making calculations from the record sheet. The record sheets are usually provided with base lines and unit lines from which calculations may be made. If the sheet expands or contracts during the production of the record, these record lines formed thereon cannot be related to the base lines which are printed on the paper with accuracy. If there is no expansion or contraction, then, of course, the record may be calculated from these base lines printed on the record sheet. The lines b and c produced by these stylographs 60 and 61 which are set at a fixed distance apart during the recording of the normal record lines b and c may be used as base lines to determine to what extent the paper is expanded or contracted, and thereby errors which might arise from the expansion or contraction of the paper rectified.

It is thought that the operation of the recorder will be obvious from the statements made in connection with the describing of the various features in detail. The stylograph 59 is moved back and forth across the record sheet by the rise and fall of the water stage and will reverse its movement at the end of the drum even though the water stage continues to rise. The stylograph 61 making a line on the record sheet will indicate the particular characteristic in the variable being recorded that caused the reversal of the graph. The stylograph 60 will make a line on the record sheet which, together with the record line made by the stylograph 61, is helpful for calculations, but it will also make a record of time intervals on the record sheet, so that one can readily interpret from the record sheet the exact condition of the water stage at any time interval desired. There are only two actuating mechanisms in the recorder; one is the actuating mechanism for the feed of the sheet and the movement of the stylograph recording the time intervals, and the other is the actuating mechanism controlled by the water stage which moves the carriage, positioning the stylograph carried thereby, and also which operates the stylograph producing the record line that indicates the characteristic of the variable, causing a reversal of movement of the carriage when it reaches the end of the control drum. The actuating mechanism for feeding the sheet is time-controlled, and this same time controlling mechanism operates the stylograph for producing a record of time intervals on the sheet. The feeding mechanism for the sheet permits an adjustment for changing the speed of travel of the sheet without changing the speed of the timing mechanism, and therefore, a change in the feed of the sheet does not, in any way, interfere with the proper operation of the stylograph recording time intervals.

The entire operating mechanism is housed and sealed within a casing so as to protect it from moisture. The clock although it is on the exterior of one of the end members, is housed within a casing. There is a cover plate 128 of sheet metal which is shaped to conform to the end members and which contacts therewith. This cover plate is rigidly secured to a bar 129, which bar is placed on supporting brackets 130 having upstanding portions inclining away from the base of the recorder. There is a lug 131 carried by the end member which projects outwardly from the face of the end member. This bar 129 extends beyond the ends of the end members and is placed on the supporting brackets 130 and beneath the lugs 131. Rods 132 made in sections so that they can be lengthened or shortened, are mounted in the depending flanges 133 of the base 1. The rods are provided with hook ends 134 which may be turned so as to project upwardly and then placed against the bar 129. When so positioned, the upturned end 135 of the rod will extend up above a bar 136 which is also attached to the cover plate at the other side thereof. A clamping screw 137 is then turned against the bar 136 and will clamp the same firmly against the base 1. Prior to the clamping of the bar firmly against the base, clamping members 138 carried by depending brackets 139 attached to the bar 136, are brought against the under face of one of the flanges 133. This will draw the cover plate tightly down into contact with the end members, and then the final clamping action of the screws 137 firmly holds the bars 129 and 136 against the base. These clamping screws enable a sealed connection to be made between the cover plate 128 and the end members and base, thus protecting all of the actuating mechanism and the record sheet from moisture.

Having thus described the invention, what I claim as new and desire to secure by Letters Patent, is—

1. In a recorder having means for supporting and operating a record sheet, the combination of a carriage movable transversely across said sheet, a stylograph carried by the carriage and contacting with said sheet for producing a record line thereon, a control drum for reciprocating said carriage, means associated with the control drum for reversing the movement of the carriage while said control drum is moving in the same direction, means for rotating said control drum responsive to the changes in a variable movement to be recorded, a second stylograph contacting with and producing a record line on said sheet, a control disk operatively connected to said drum and driven in synchronism therewith, means for supporting said last-named stylograph including an arm yieldingly moved into contact with said control disk, and a cam member on said control disk for shifting said second stylograph to offset the record line made thereby when said carriage is reversed by a continued movement of the control drum in the same direction.

2. In a recorder having means for supporting and operating a record sheet, the combination of a carriage mounted for movement transversely of the record sheet, a stylograph carried thereby, a control drum having reverse spiral grooves formed therein extending from end to end of the drum and crossing each other, an actuating boat carried by said carriage and movable along the grooves in said drum when said drum is rotated, a pin mounted on said carriage at each side of said actuating boat, a reversing cam carried by the drum at each end thereof with which the pin at the adjacent end of the carriage contacts for reversing the movements of the carriage and the shifting of the actuating boat from one spiral groove to the other while the drum continues to rotate in the same direction, and means responsive to a variable movement to be recorded for rotating said drum.

3. In a recorder having means for supporting and operating a record sheet, the combination of a carriage mounted for movement transversely of the record sheet, a stylograph carried thereby, a control drum having reverse spiral grooves formed therein extending from end to end of the drum and crossing each other, an actuating boat carried by said carriage and movable along the grooves in said drum when said drum is rotated, a pin mounted on said carriage at each side of said actuating boat, a reversing cam carried by the drum at each end thereof with which the pin at the adjacent end of the carriage contacts for reversing the movements of the carriage and the shifting of the actuating boat from one spiral groove to the other while the drum continues to rotate in the same direction, means responsive to a variable movement to be recorded for rotating said drum, a second stylograph for producing a record line on said sheet, and means operated by the drum for changing the characteristics of said last named record line when the carriage is reversed by a continued movement of the drum in the same direction.

4. In a water stage recorder having means for supporting and operating a record sheet, the combination of a carriage movable transversely across said sheet, a stylograph carried thereby and contacting with the record sheet for producing a record line thereon, a control drum having reverse spiral grooves formed therein extending from end to end thereof and crossing each other, an actuating boat carried by said carriage and movable along one of said grooves and into the other for reversing the movement of the carriage while the drum continues to rotate in the same direction, a reversing cam disposed at the end of the drum and means mounted on the carriage and cooperating with said cam for causing the reversal of the same without lost motion while the drum continues to rotate in the same direction, means responsive to the variable water stage to be recorded for rotating said drum, a second stylograph contacting with and producing a record line on the record sheet for indicating conditions causing reversal of the carriage, and means operating in synchronism with said drum for shifting said second stylograph to offset the record line made thereby when the carriage is reversed by a continued movement of the control drum in the same direction.

CARL H. AU.